US010591277B2

(12) United States Patent
Kallay et al.

(10) Patent No.: US 10,591,277 B2
(45) Date of Patent: Mar. 17, 2020

(54) METHOD AND SYSTEM FOR MEASURING OUTERMOST DIMENSION OF A VEHICLE POSITIONED AT AN INSPECTION STATION

(71) Applicant: Liberty Reach Inc., Clearwater, ID (US)

(72) Inventors: Michael Kallay, Bellevue, WA (US); Gary W. Bartos, Somerville, MA (US); Grason Brennan, Ann Arbor, MI (US); G. Neil Haven, Clearwater, ID (US)

(73) Assignee: Liberty Reach Inc., Clearwater, ID (US)

( * ) Notice: Subject to any disclaimer, the term of this patent is extended or adjusted under 35 U.S.C. 154(b) by 144 days.

(21) Appl. No.: 15/221,803

(22) Filed: Jul. 28, 2016

(65) Prior Publication Data

US 2018/0031364 A1    Feb. 1, 2018

(51) Int. Cl.
*G01B 11/02* (2006.01)
*G01B 11/22* (2006.01)
*G06T 7/60* (2017.01)

(52) U.S. Cl.
CPC .............. *G01B 11/02* (2013.01); *G01B 11/22* (2013.01); *G06T 7/60* (2013.01); *G06T 2207/10028* (2013.01); *G06T 2207/30252* (2013.01)

(58) Field of Classification Search
CPC .................... G01B 11/02; G01B 11/22; G06T 2207/30252; G06T 7/60
See application file for complete search history.

(56) References Cited

U.S. PATENT DOCUMENTS 5,193,288 A * 3/1993 Stifnell .................. G01B 5/207
                                                       33/413
6,542,249 B1    4/2003 Kofman et al.
(Continued)

FOREIGN PATENT DOCUMENTS

JP    2004317495 A    11/2004
JP    2008292365 A    12/2008
(Continued)

OTHER PUBLICATIONS

EP Application No. 17186892 EP Search Report dated Dec. 18, 2017.
(Continued)

*Primary Examiner* — Anner N Holder
(74) *Attorney, Agent, or Firm* — Brooks Kushman P.C.

(57) ABSTRACT

Method and system for measuring outermost dimensions of a vehicle positioned at an inspection station and having top, front, back and side exterior surfaces are provided. The system includes a plurality of 3-D or depth sensors supported around and above the vehicle at the inspection station. Each of the sensors has a field of view so that one of the exterior surfaces of the vehicle is in one of the fields of view. Each sensor includes a set of radiation sensing elements which detect projected radiation reflected from its exterior surface to obtain sensor data. At least one processor processes the sensor data from each of the sensors to obtain a virtual 3-D model of the vehicle. Control logic is employed to obtain measurements of outermost dimensions of the vehicle based on the 3-D model.

13 Claims, 6 Drawing Sheets

(56) References Cited

U.S. PATENT DOCUMENTS

| | | | |
|---|---|---|---|
| 7,889,931 B2* | 2/2011 | Webb | G01N 21/8806 |
| | | | 382/141 |
| 9,248,353 B1 | 2/2016 | Koenig et al. | |
| 9,412,203 B1* | 8/2016 | Garcia, III | G06T 19/006 |
| 10,289,699 B2* | 5/2019 | Chen | G01N 23/04 |
| 10,373,262 B1* | 8/2019 | Haller, Jr. | G06K 9/00671 |
| 2004/0246471 A1 | 12/2004 | Matsuura et al. | |
| 2004/0253010 A1 | 12/2004 | Takahashi | |
| 2005/0267657 A1* | 12/2005 | Devdhar | G06K 9/00208 |
| | | | 701/33.4 |
| 2006/0071154 A1 | 4/2006 | Osako et al. | |
| 2007/0229661 A1 | 10/2007 | Aoki et al. | |
| 2009/0268965 A1* | 10/2009 | Mita | G01B 11/25 |
| | | | 382/190 |
| 2009/0290757 A1* | 11/2009 | Mian | G06K 9/00214 |
| | | | 382/104 |
| 2010/0118123 A1 | 5/2010 | Freedman et al. | |
| 2011/0134114 A1 | 6/2011 | Rais et al. | |
| 2011/0205341 A1 | 8/2011 | Wilson et al. | |
| 2012/0274745 A1* | 11/2012 | Russell | G06F 3/013 |
| | | | 348/46 |
| 2014/0036070 A1 | 2/2014 | Eckard et al. | |
| 2014/0176679 A1* | 6/2014 | Lehning | G06K 9/00208 |
| | | | 348/46 |
| 2014/0240451 A1* | 8/2014 | Sakano | G01N 21/8806 |
| | | | 348/36 |
| 2015/0124086 A1 | 5/2015 | Melle et al. | |
| 2015/0266153 A1 | 9/2015 | Kanehira et al. | |
| 2016/0173740 A1* | 6/2016 | Corby | G06K 9/6267 |
| | | | 348/144 |
| 2017/0068756 A1* | 3/2017 | Wilsher | G06F 17/509 |
| 2017/0109940 A1* | 4/2017 | Guo | G06T 19/20 |
| 2017/0148102 A1* | 5/2017 | Franke | G06Q 10/20 |
| 2017/0236320 A1* | 8/2017 | Gribetz | G06T 19/00 |
| | | | 345/419 |
| 2017/0287212 A1 | 10/2017 | Tran et al. | |

FOREIGN PATENT DOCUMENTS

| | | |
|---|---|---|
| JP | 2008309533 A | 12/2008 |
| JP | 2011128756 A | 6/2011 |
| JP | 2015135330 A | 7/2015 |
| JP | 2015520011 A | 7/2015 |

OTHER PUBLICATIONS

U.S. Appl. No. 15/249,613 Office Action dated Dec. 22, 2017.
Japanese Patent Office, Notice of Reasons for Refusal (Non-Final Office Action) for Japanese Patent Application No. 2017-144666 dated Mar. 5, 2019.
Japanese Patent Office, Notice of Reasons for Refusal for Japanese Patent Application No. 2017-144666, dated Dec. 3, 2019.
Japanese Patent Office, Summary of the Notice of Reasons for Refusal for Japanese Patent Application No. 2017-144666, dated Dec. 3, 2019.

* cited by examiner

METHOD AND SYSTEM FOR MEASURING OUTERMOST DIMENSION OF A VEHICLE POSITIONED AT AN INSPECTION STATION

TECHNICAL FIELD

At least one aspect of the present invention generally relates to methods and systems for measuring the dimensions of a vehicle and, in particular, to methods and systems for automatically measuring the outermost dimensions of a vehicle at an inspection station without the need for placing vision targets on the outermost regions of the vehicle.

Overview

Shaken, a contraction of Jidōsha Kensa Tōrokuseido ("automobile inspection registration"), is the name of the vehicle inspection program in Japan for motor vehicles over 250 cc in engine displacement.

The inspection system is in place to ensure that vehicles on Japanese roads are properly maintained and are safe to be on the road. Another reason is to determine if a vehicle has been illegally modified. Illegally modified vehicles and vehicles deemed unsafe will have a red sticker with the following: fuseikaizousha (Illegal Vehicle) in yellow and the date the vehicle was declared not fit to be on the street.

An initial inspection occurs at the vehicle's first registration and renewal inspections must then take place at prescribed intervals thereafter.

The process of shaken involves an exterior inspection to ensure the vehicle meets Japanese exterior regulations and does not have illegal exterior modifications such as extreme body kits that increase the exterior dimensions.

Some of the exterior requirements include:
Tailpipes: Tailpipes are not allowed to protrude past the car's body, however, tailpipes that are built into the side of the vehicle are allowed.
Body kits/Aero parts: Aerodynamic mirrors, windage trays under the tail section of the car and body kits using front bumper scoops are allowed. However, all aerodynamic parts must fit and be molded correctly so they are flush with the car's body.
Fenders and Overfenders: All fenders and overfenders (including widebody style-kits) must not inhibit the turning of the car's wheels (which must be able to turn 30 degrees inward and 50 degrees outward).
Spoilers: All spoilers (aftermarket or OEM) must not be wider than the car's rear and must be bolted to the car's trunk.

Figure 1:
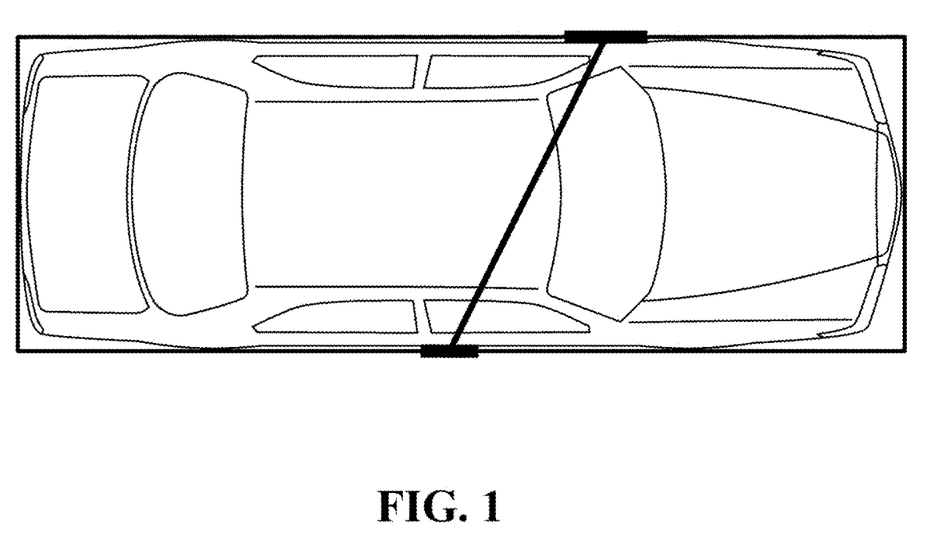
FIG. 1 is a top plan view of a vehicle on which vision targets have been placed; the targets have been placed off-center thereby resulting in an incorrect measurement as shown by the solid line extending between the targets.
Figure 2:
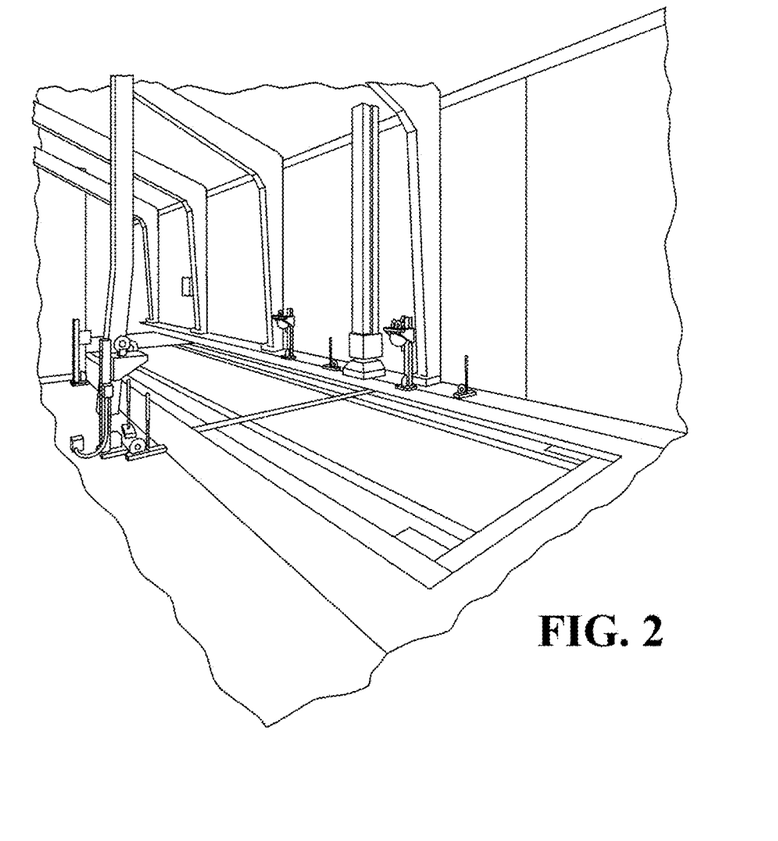
FIG. 2 is a schematic, perspective view of a Kei car (i.e., light automobile) measurement facility.

NEC and IYASAKA use systems that measure vehicle dimensions. Initially, a vehicle is driven into a station, such as the measurement facility of FIG. 2. Once parked, the driver exits the vehicle and stands to the side. The workers present at the station then proceed to manually determine the outermost dimensions of the vehicle. Vision targets are then manually placed on these outermost regions. A total of at least five targets must be manually placed with one each on the front, each side, back and roof of the vehicle. This process takes anywhere from 2-5 minutes and is both error-prone and time consuming. Once these targets are placed, 2-D cameras positioned around the cell take an image of the vehicle and generate a measurement. This measurement is simply the distance between the two targets on each side. An off-center placement will result in an incorrect measurement as shown by the solid line extending between side targets of FIG. 1.

Some of the problems associated with the above-noted systems include:
Mandatory targets which must be placed manually on the vehicle.
Slow to operate.
Uses 2-D cameras, which are limited in their ability to determine distance across a wide field of view. 2-D cameras are needed to yield what is essentially a single-point measurement.
Unable to cope with vehicle rotation while retaining measurement accuracy.
Vehicle must be physically touched in order to measure.

Consequently, there is a need to solve one or more of the above-noted problems associated with the prior art methods and systems automatically and accurately.

SUMMARY OF EXAMPLE EMBODIMENTS

An object of at least one embodiment of the present invention is to provide a method and system for optically inspecting the exterior surfaces of a vehicle at an inspection station automatically, accurately and simply for both inspection station operators and drivers.

In carrying out the above object and other objects of at least one embodiment of the present invention, a method of measuring outermost dimensions of a vehicle positioned at an inspection station is provided. The vehicle has top, front, back and side exterior surfaces. The method includes for each of the exterior surfaces of the vehicle: (1) projecting radiation onto the exterior surface to obtain reflected radiation; (2) sensing at least a portion of the reflected radiation to obtain an image; and (3) imaging and detecting beams of radiation reflected from the exterior surface to obtain an image of the reflected beams. The method also includes processing the images of the reflected radiation and the reflected beams for each exterior surface to obtain measurements of the outermost dimensions of the vehicle.

The method may further include determining if the vehicle has been illegally modified based on the measurements.

The projected radiation may have a known pattern and wherein each known pattern of radiation may be non-visible light.

The image of the reflected beams may be a color image.

The non-visible light may be near-infrared or near-ultraviolet light.

Further in carrying out the above object and other objects of at least one embodiment of the invention, a system for measuring outermost dimensions of a vehicle positioned at an inspection station is provided. The vehicle has top, front, back and side surfaces. The system includes a plurality of 3-D or depth sensors supported around and above the vehicle at the inspection station. Each of the sensors has a field of view so that one of the exterior surfaces of the vehicle is in one of the fields of view. Each sensor includes a set of radiation sensing elements which detect projected radiation reflected from its exterior surface to obtain sensor data. At least one processor processes the sensor data from each of the sensors to obtain a virtual 3-D model of the vehicle. Control logic is employed to obtain measurements of outermost dimensions of the vehicle based on the 3-D model.

The control logic may determine if the vehicle has been illegally modified based on the measurements.

The processed sensor data may include a plurality of individual points in space which represent an image wherein each of the points has a position in space and an associated color value.

Each of the sensors may include a pattern emitter for projecting a known pattern of radiation and a detector for detecting the known pattern of radiation reflected from its exterior surface.

Each emitter may emit a non-visible pattern of radiation and each detector may detect the reflected, non-visible pattern of radiation.

Each sensor may include a lens and detector assembly to image and detect beams of radiation reflected from its respective exterior surface.

Each lens and detector assembly may include a color camera.

Each of the sensors may be a volumetric sensor capable of capturing thousands of individual points in space.

Each of the sensors may include a color camera wherein each of the points has both a Cartesian position in space and an associated RGB color value.

The at least one processor may process the points in space to obtain a point cloud which is virtual 3-D model of the vehicle.

The at least one processor may compute a bounding 3-D box to the 3-D model wherein the control logic may determine dimensions of the 3-D bounding box.

The system may further include a 3-D display to display the 3-D model and the bounding box and a user interface to allow a user of the system to manipulate the dimensions of the 3-D box.

Each of the sensors may be a multi-spectral sensor.

The vehicle typically has an axis of symmetry wherein the user interface may allow the user to adjust the axis of symmetry.

The 3-D box may be a plurality of bounding planes wherein the user interface allows the user to select one of the bounding planes and move the selected bounding plane along the axis of symmetry.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In general, at least one embodiment of a method and system for measuring the outermost dimensions of a vehicle positioned at an inspection state are provided. The exterior surfaces (such as top, front, back and side surfaces) of a motor vehicle such as an automobile are optically inspected to improve the prior art measurement process and make it as simple as possible, both for the inspection station operators and for the drivers. This is accomplished in a number of ways.

Figure 3:
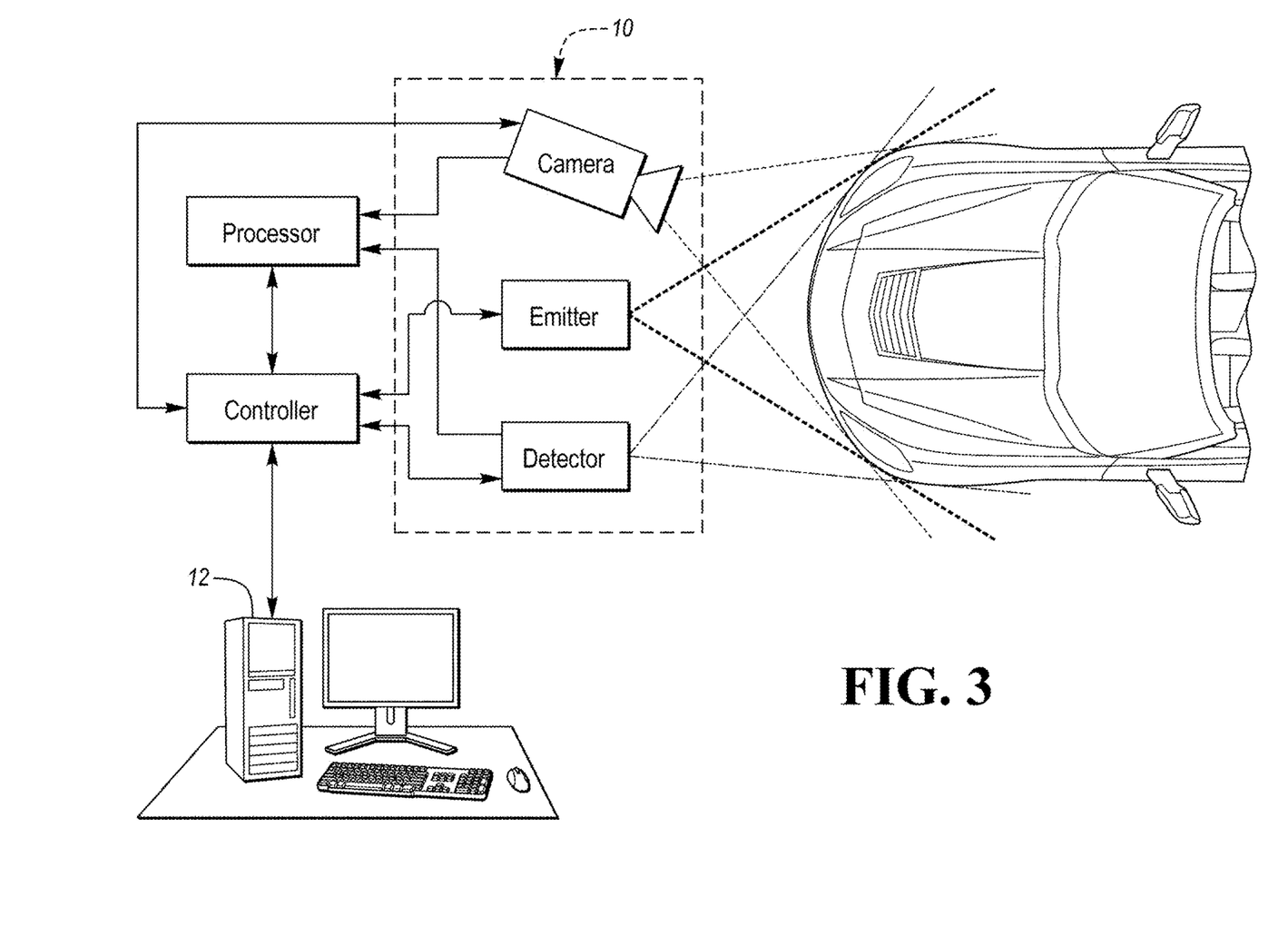
FIG. 3 is a block diagram of a system constructed in accordance with at least one embodiment of the present invention together with the front portion of a vehicle to be measured.
Figure 4:
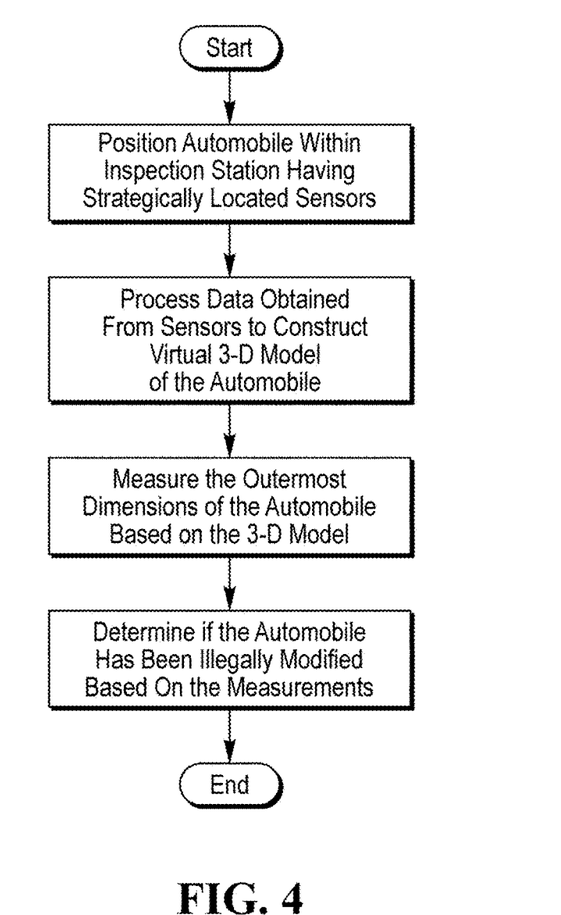
FIG. 4 is a block diagram flow chart illustrating a method of at least one embodiment of the present invention.

First, the traditional, prior art 2-D cameras are replaced with 3-D or depth sensors such as 2.5D volumetric sensors, one of which is generally indicated at 10 in FIG. 3. These sensors consist of a near-infrared pattern emitter, a near-infrared detector and a color camera. The near infrared pattern is projected onto the surface of the vehicle and is read along with the information from the color camera. This provides the ability to interpret an image in what is traditionally referred to as two and a half dimensions. It is not true 3-D due to the sensor only being able to detect surfaces that are physically visible to it (i.e., it is unable to see through objects or to see surfaces on the far side of an object).

Alternatively, the 3-D depth sensors may comprise light-field, laser scan, time of flight or passive binocular sensors, as well as active monocular and active binocular sensors.

Preferably, the 3-D or depth sensors of at least one embodiment of the invention measure distance via massively parallel triangulation using a projected pattern (a "multi-point disparity" method). Another method for measuring a distance field is called "time-of-flight" in which, instead of projecting a spatial pattern, the sensor projects pulses of light energy and then measures how long the pulses take to return after reflecting off the target.

Multiple volumetric sensors are placed in key locations around and above the vehicle. Each of these sensors typically captures hundreds of thousands of individual points in space. Each of these points has both a Cartesian position in space and an associated RGB color value. Before measurement, each of these sensors is registered into a common coordinate system. This gives the present system the ability to correlate a location on the image of a sensor with a real world position. When an image is captured from each sensor, the pixel information, along with the depth information, is converted by a computer 12 into a collection of points in space, called a point cloud. The computer 12 controls a controller which, in turn, controls a processor, the camera, the emitter and the detector of the sensor 10. This point cloud is essentially a 1:1 virtual 3-D model of the vehicle.

In its first iteration, the point cloud is rather noisy and has a number of points that fall outside of the actual model of the vehicle. The present system cleans up outliers and subsequently smooths the point cloud into geometric surfaces.

The method and system of at least one embodiment of the present invention are able to measure the whole vehicle not just the areas where targets are placed. Using a two-stage fitting algorithm, the system then corrects rotation of the vehicle so that measurement to determine dimensions is done square to the symmetry of the vehicle. With the vehicle point cloud now properly aligned, cleaned and smoothed it is a trivial matter to determine the distance between the outermost points in the point cloud.

The system, by default, provides a filtering mechanism to ignore protrusions from the vehicle which are smaller than some predetermined dimensions. This filtering mechanism ensures that small protrusions (such as radio antennae) are not counted as part of the vehicle's point cloud, so they do not contribute to the calculated size of the vehicle. However, this default operation can be overridden by the user, so that the system provides the option of manually adjusting the measurement of the vehicle. This adjustment is easy to understand due to a generated measurement bounding box appearing around the 3-D point cloud of the vehicle as shown by the screen shots of FIGS. 5-7 as described in detail hereinbelow.

The method or process of data acquisition, cloud stitching, smoothing and measurement completes in under 20 seconds. In addition to this speed increase, the 3-D display that the system presents allows a user to look at an entire vehicle from any viewpoint. This is a significant improvement compared to the 2-5 minutes that were required to measure a vehicle using the older prior art methods.

Figure 5:
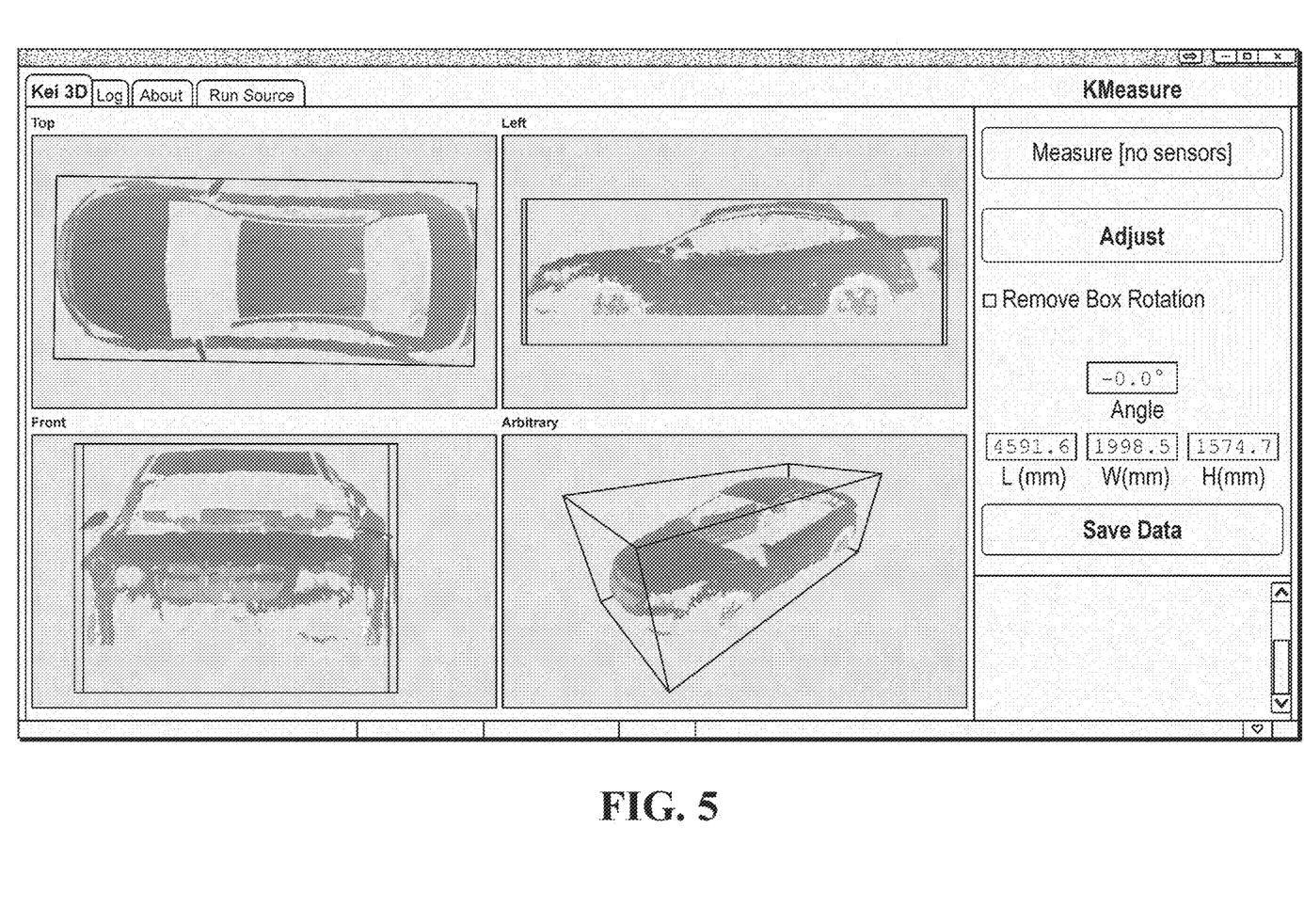
FIGS. 5-7 are screenshots of a vehicle immediately after measurement, just prior to a user preparing to adjust the dimensions of a bounding box and as a user is selecting a particular bounding plane from the box, respectively.

A first screenshot of FIG. 5 shows a vehicle immediately after measurement. A 3-D bounding, wire frame box is calculated for the vehicle by finding an axis of symmetry (which defines the long axis of the vehicle) and then fitting the 3-D envelope of the vehicle with a box aligned along the axis of symmetry.

Figure 6:
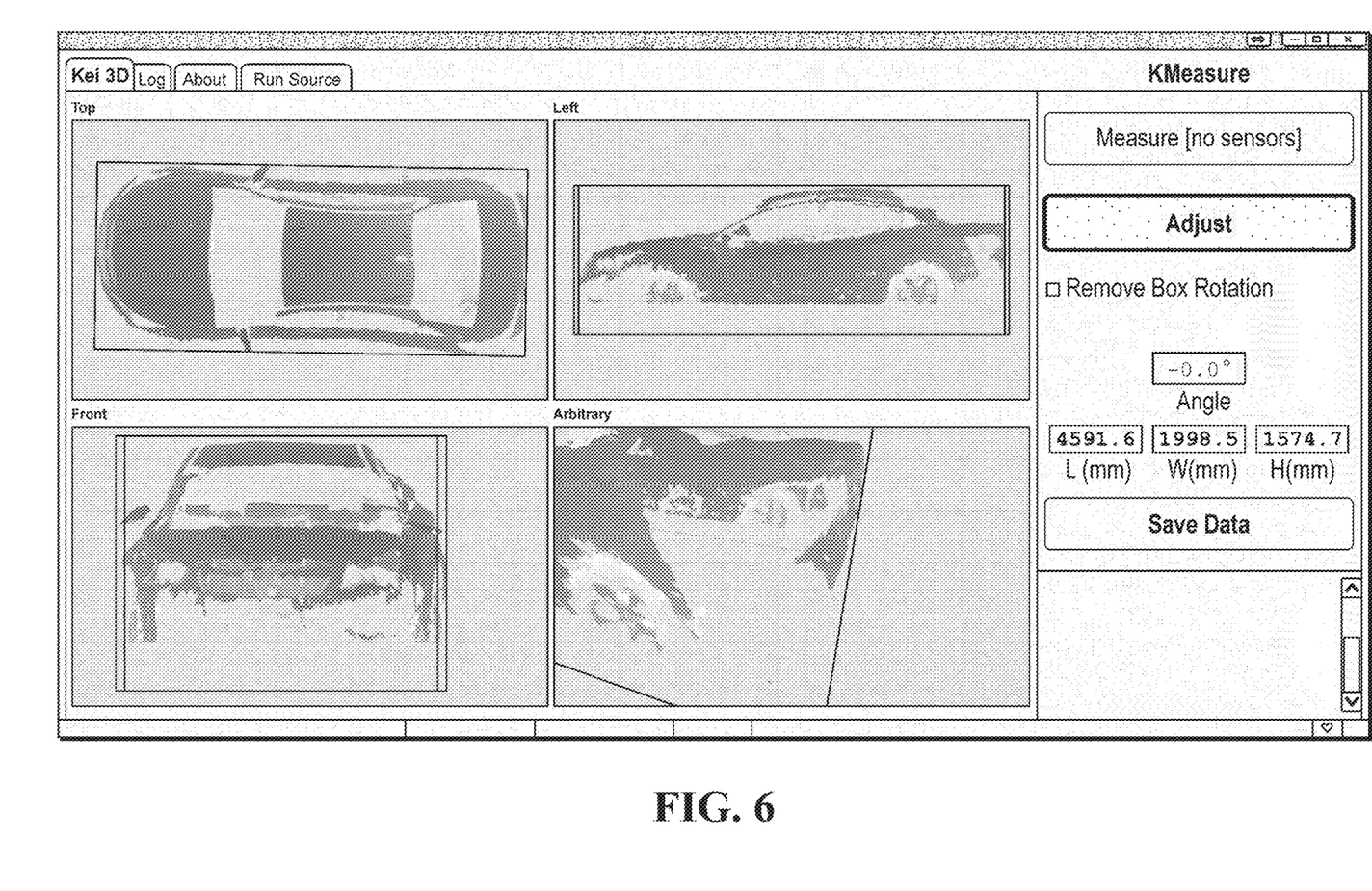

A second screenshot of FIG. 6 shows a user preparing to adjust the dimensions of the bounding box manually by clicking the "Adjust" button.

Figure 7:
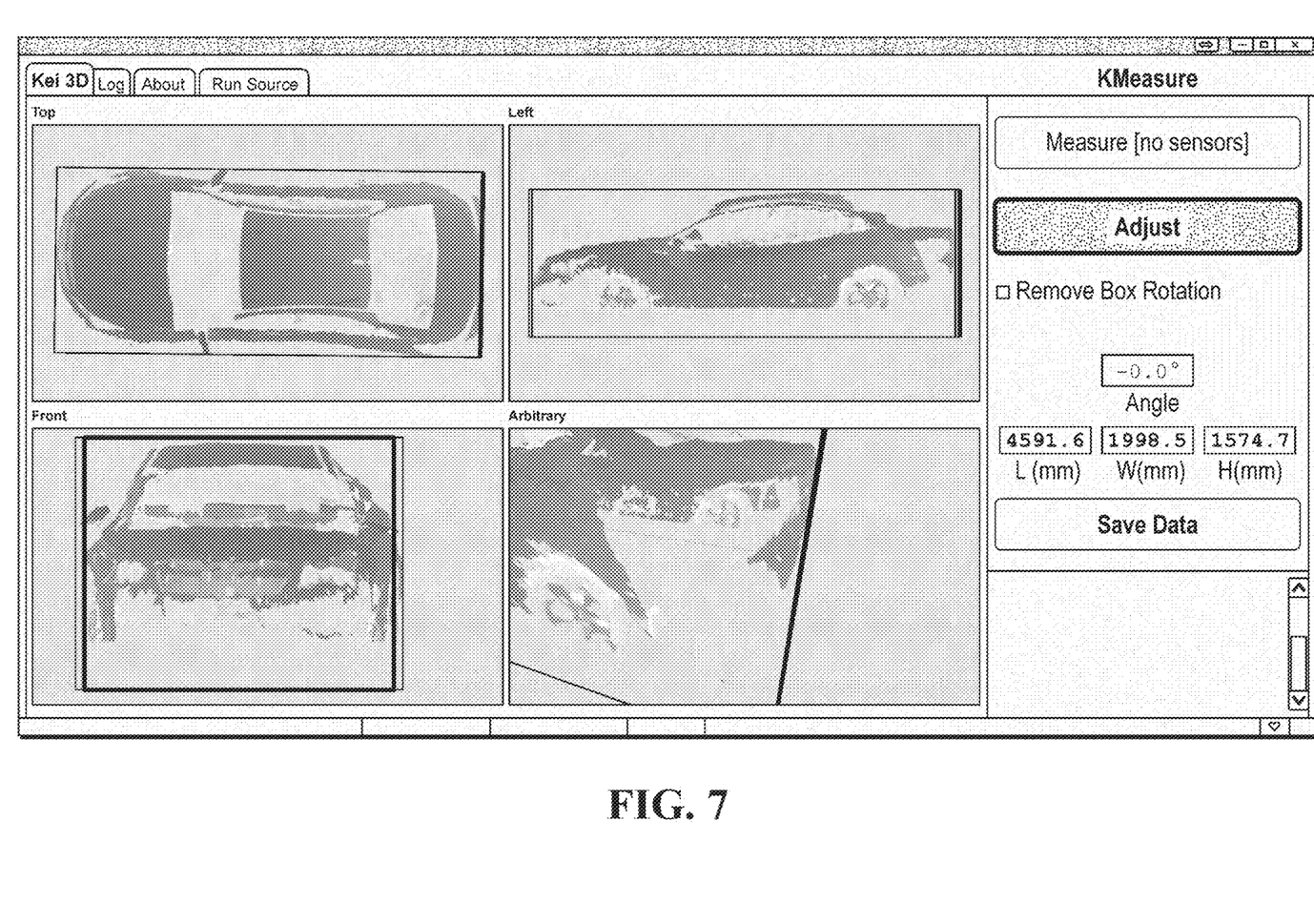

A third screenshot of FIG. 7 shows a user selecting a particular bounding plane from the bounding box. A (rectangular portion of the) plane turns yellow and the mouse turns to a hand-shaped icon. The user then may drag the plane to and fro along the axis of the bounding box perpendicular to the plane.

The user interface also allows the user to adjust the axis of symmetry of the vehicle. This aspect of the user interface is not shown in these screenshots, but functions similarly. The user clicks a button, and then may rotate the bounding box around the axis orthogonal to the floor.

In summary, the method and system of at least one embodiment of the present invention provides a touch-less vehicle measurement application and is an improvement to the state of the art of automatic vehicle measurement. Using advanced algorithms and point-cloud stitching technology, it is able to correctly measure the dimensions of any reasonably sized vehicle driven into a measurement cell or station.

Embodiments of the invention can take the form of an entirely hardware embodiment, an entirely software embodiment or an embodiment containing both hardware and software elements. In a preferred embodiment, the invention including control logic is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A system for measuring outermost dimensions of a vehicle positioned at an inspection station and having top, front, back and side exterior surfaces, the system comprising:

a plurality of 3-D or depth sensors supported around and above the vehicle at an inspection station, each of the sensors having a field of view so that one of the exterior surfaces of the vehicle is entirely in one of the fields of view, each sensor including a set of radiation sensing elements which detect projected radiation reflected from its exterior surface to obtain sensor data wherein each of the sensors is capable of capturing thousands of individual points in space and wherein each of the points has a position in space;

at least one processor to process the points in space to obtain a 3-D point cloud of the vehicle which is a virtual 3-D model of the entire vehicle; and control logic to obtain measurements of the outermost dimensions of the vehicle based on the 3-D model wherein the control logic determines if the vehicle has been modified with illegal exterior modifications which increase the outermost dimensions of the vehicle based on the measurements.

2. The system as claimed in claim 1, wherein the processed sensor data includes a plurality of individual points in space which represent an image and wherein each of the points has a position in space and an associated color value.

3. The system as claimed in claim 1, wherein each of the sensors includes a pattern emitter for projecting a known pattern of radiation and a detector for detecting the known pattern of radiation reflected from its exterior surface.

4. The system as claimed in claim 3, wherein each emitter emits a non-visible pattern of radiation and each detector detects the reflected, non-visible pattern of radiation.

5. The system as claimed in claim 1, wherein each sensor includes a lens and detector assembly to image and detect beams of radiation reflected from its respective exterior surface.

6. The system as claimed in claim 5, wherein each lens and detector assembly includes a color camera.

7. The system as claimed in claim 1, wherein each of the sensors is a volumetric sensor capable of capturing thousands of individual points in space.

8. The system as claimed in claim 7, wherein each of the sensors includes a color camera and wherein each of the points has both a Cartesian position in space and an associated RGB color value.

9. The system as claimed in claim 7, wherein the at least one processor computes a bounding 3-D box to the 3-D model and wherein the control logic determines dimensions of the 3-D bounding box.

10. The system as claimed in claim 9, further comprising a 3-D display to display the 3-D model and the bounding box and a user interface to allow a user of the system to manipulate the dimensions of the 3-D box.

11. The system as claimed in claim 1, wherein each of the sensors is a multi-spectral sensor.

12. The system as claimed in claim 10, wherein the vehicle has an axis of symmetry and wherein the user interface allows the user to adjust the axis of symmetry.

13. The system as claimed in claim 12, wherein the 3-D box has a plurality of bounding planes and wherein the user interface allows the user to select one of the bounding planes and move the selected bounding plane along the axis of symmetry.

* * * * *